US000001450H

United States Statutory Invention Registration [19]

[11] Reg. Number: H1450

[43] Published: Jun. 6, 1995

Okumura et al.

[54] SILVER HALIDE LIGHT-SENSITIVE PHOTOGRAPHIC MATERIAL

[75] Inventors: Mitsuhiro Okumura; Takaaki Kojima; Takahiko Nojima, all of Hino, Japan

[73] Assignee: Konica Corporation, Hino, Japan

[21] Appl. No.: 312,441

[22] Filed: Sep. 26, 1994

Related U.S. Application Data

[63] Continuation of Ser. No. 124,314, Sep. 20, 1993, abandoned.

[30] Foreign Application Priority Data

Sep. 24, 1992 [JP] Japan ..... 4-254951

[51] Int. Cl.[6] ..... G03C 1/76

[52] U.S. Cl. ..... 430/571; 430/574; 430/963

[58] Field of Search ..... 430/505, 571, 574, 963

[56] References Cited

U.S. PATENT DOCUMENTS 5,124,244 6/1992 Waki et al. ..... 430/567
5,206,120 4/1993 Hayashi ..... 430/567
5,270,158 12/1993 Nakatsugawa et al. ..... 430/571

FOREIGN PATENT DOCUMENTS 106705 4/1984 European Pat. Off. .
231861 8/1987 European Pat. Off. .
308872 3/1989 European Pat. Off. .
488313 6/1992 European Pat. Off. .
501306 9/1992 European Pat. Off. .
11574 7/1992 WIPO .

*Primary Examiner*—Edward A. Miller
*Attorney, Agent, or Firm*—Bierman and Muserlian

[57] ABSTRACT

A silver halide light-sensitive photographic material is disclosed. The photographic material comprises a support and a blue-sensitive silver halide emulsion layer. The blue sensitive emulsion layer comprises a mixture of at least two kinds of silver halide emulsions each comprises silver chloride grains or silver chlorobromide grains containing not less than 90 mol % of silver chloride and are sensitized with a blue-sensitizing dye and have an average grain size of from 0.6 μm to 0.9 μm in terms of diameter of spherical grain. The average grain sizes of the two kinds of the emulsions are different from each other in the average grain size by 0.05 μm or more. The coating amount of the blue-sensitizing dye contained in the blue-sensitive emulsion layer is not more than $7.0\times10^{-4}$ g/m$^2$.

4 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SILVER HALIDE LIGHT-SENSITIVE PHOTOGRAPHIC MATERIAL

This application is a continuation of application Ser. No. 08/124,314, filed Sep. 20, 1993, now abandoned.

FIELD OF THE INVENTION

The present invention relates to a light-sensitive silver halide photographic material for photo-printing. To be more specific. The present invention relates to a color light-sensitive silver halide photographic material which is excellent in gradation and of which is capable of improving the productivity of printing process.

BACKGROUND OF THE INVENTION

Recently in the field of photographic print, for the purpose of shortening delivery date and improving productivity of printing process, a method of shortening printing time has employed by using silver halide photographic material with high silver chloride content and rapid development. However, since development speed of silver chloride is remarkably fast, it is found that it is difficult to maintain continuous gradation from highlight to shadow portions of the characteristic curve, and that the curve tends to irregularly bend depending upon the processing condition.

Against this disadvantage, a method, whereby it is possible to obtain a characteristic curve with an expanded straight portion from highlight to shadow, by using a silver halide emulsion in which two or more kinds of silver halide grains with different sensitivities are mixed at a suitable ratio, has been proposed and the effect thereof has been recognised.

However, it has been found out when the method for improving gradation characteristics by mixing these emulsions, is applied, especially to a silver halide emulsion sensitized in the blue-light, variation in the gradation at the time of exposure is often seen against the change of the temperature, and thus improvement in the expansion of gradation, which is a main object of the present invention, cannot be achieved.

In view of the state of the art, the appearance of a light-sensitive silver halide photographic material for print which is applicable to rapid process and has improved gradation has long been waited.

SUMMARY OF THE INVENTION

The object of the present invention is to provide a light-sensitive silver halide photographic material which is excellent in gradation and stable against external environmental changes such as variations of temperature at the time of exposure.

The silver halide light-sensitive material of the invention comprises a support having thereon a blue-sensitive silver halide emulsion layer, comprising a mixture of at least two kinds of silver halide emulsions each optically sensitized with a blue-sensitizing dye, wherein (1) the silver halide emulsions each comprise silver chloride grains or silver chlorobromide grains having a silver chloride content not less than 90 mol %, (2) the silver halide emulsions each have an average grain size, in terms of diameter of spherical grain being within the range of 0.6 μm to 0.9 μm and being different from each other by 0.05 μm or more in the average grain size, and (3) the coating amount of the blue-sensitizing dye is not more than $7.0\times10^{-4}$ g/m$^2$.

DETAILED DESCRIPTION OF THE INVENTION

Silver halide emulsion grain advantageously used in the present invention is one having a silver chloride content of 95–99.95 in terms of mol %. And, more preferably, it is a silver chlorobromide grain which substantially contains no silver iodide. For the purpose of shortening developing time and lowering replenishing amount of the color developer, more preferable silver chloride content is 99.5–99.9 mol %.

As for the crystal shape of the silver halide grain used for the photographic material of the present invention, an arbitary one may be used. According to one preferable embodiment of the present invention, cubic crystals having <100> faces can be mentioned. Moreover, silver halide grains having an octahedral, tetradecahedral or dodecahedral crystal shape, which may be prepared according to the method disclosed, for example, in U.S. Pat. Nos. 4,183,756 and 4,225,666, japanese Patent O.P.I Publications No. 55-26589 (1980), Japanese Patent Publication No. 55-42737 (1980), Journal of Photographic Sciences Vols. No. 21 and 39(1973), etc. may also be used. Farther, grains which have twin plane can also may be used.

Silver halide grains used for the light-sensitive photographic material of the present invention may comprise of a single shape or a mixture of two or more grains of different shapes.

The grain size of the silver halide grains used for the light-sensitive photographic material of the present invention falls within the range between 0.6 and 0.9 microns in terms of diameter when the grain size is converted into an equivalent projection circle.

In the photographic material of the present invention, in order to realize excellent gradation characteristics, it is preferable that the silver halide emulsion is a mixture of two kinds of silver halide emulsions of which average grain size falls within the range between 0.6 and 0.9 μm and the grain size difference between the respective emulsions is more than 0.05 μm. A preferable grain size difference is between a range of 0.07 and 0.15 μm. As a preferable example, a mixture of two kinds of emulsions, of which average grain sizes are 0.7 μm and 0.8 μm, respectively, at a ratio of 65:35 may be mentioned.

The above-mentioned grain size can be measured by various methods used in the photographic field. As typical methods, those described in "Analytical Method for Particle Diameter Measurement" written by Loveland, Symposium on Light Microscopy, A.S.T.M., pp. 94–122(1955) and in "The Theory of Photographic Process, Vol.3" (Mees and James, and published by Mcmillan, 1966) can be mentioned.

When the grains consist substantially of a uniform shape, particle size distribution can be represented considerably accurately as a diameter or an equivalent projection area.

The grain size distribution of the silver halide grains used for the light-sensitive photographic material of the present invention may be either poly-dispersion or mono-dispersion. Preferably, mono-disperse silver halide grains of which variation coefficient of size distribution is not more than 0.22 and, more preferably, not more than 0.15 may be advantageous. Herein, the variation coefficient of grain size distribution is a factor representing the width of particle size distribution and is defined by the following equation.

Variation Coefficient=$S/R$

In the above, R is standard deviation of particle size distribution and S is the average grain size. The grain size denotes the diameter in the case of spherical silver halide grain and, in the case of the grains of other shape than spherical like cubic grain, it stands for the diameter when the projection image thereof is converted into a circle having equivalent area.

As for preparation of the silver halide emulsion used in the present invention, various methods and equipments which are well known in the art may be employed.

The silver halide emulsion used in the present invention can be the one prepared by either an acid process, a neutral process or an ammonical process. The silver halide grains in the emulsion may be the ones having been grown up either at a time or after forming seed grains. As for the method of making the seed grains and the method for growing the same, it may be either the same or different.

As for the manner of reacting the water-soluble silver salt with the water-soluble halide, either normal precipitaion method, reverse precipitation method, double-jet method, or any combination thereof may optionally be employed, the double-jet mixing method is preferable. Furthermore, as one form of the double-jet method, a method so-called "pAg-controlled double-jet process" described in Japanese Patent O.P.I. Publication No. 54-48521(1979) may also be employed.

Furthermore, an equipment provided with an additional solution-supplying equipment arranged in the mother reaction solution, from which the water-soluble silver salt and the water-soluble halide salt are supplied, which is described in Japanese Patent O.P.I. Publications No. 57-92523(1982) and 57-92524(1982). An equipment as described in the German OLS Patent Publication No. 2921164, in which the water-soluble silver salt solution and the water-soluble halide salt solution are added, while continuously changing the concentration of the salts and an equipment. Further an equipment may also be used in which the silver halide grains are formed while keeping the distance between the silver halide grains constant and taking out the reaction mother solution from the reaction vessel and condensing it by ultrafiltration method, which is described in Japanese Patent Publication No. 56-501776(1981).

Moreover, if necessary, a silver halide solvent such as the thioether can be used. Further, a compound having a mercapt group, a nitrogen-containing heterocyclic compound or a compound like a optical sensitizer may be added at the time or after completion of the formation of silver halide grains.

For the purpose of reduction sensitizing the silver halide emulsion used in the present invention, various conventional methods can be applied. For instance, a method of adding various reducing agents, a ripening method under condition of high silver ion concentration or high pH can be used.

When the silver halide emulsion used in the present invention undergoes sulfur sensitization, as the sulfur sensitizing agent, thiosulfate, an allylthiocarbazide, thiourea, an allyl iso-thiocyanate, cystine, p-toluene thiosulfate, rhodanin and an elemental sulfur, can be mentioned. Other than the above, those sulfur sensitizers described in U.S. Pat. Nos. 1,574,944; 2,410,689 and 2,278,974 can also be used. The adding amount of the sulfur sensitizing agent changes over the range considerably depending upon pH, temperature, and various other conditions such as the size of silver halide grains, etc. As the general standard, a range from about $10^{-3}$ mols to $10^{-7}$ mols per mol of silver halide mol is preferable. More preferably, it is in the range between $10^{-6}$ and $10^{-5}$ mols.

It is preferable that the silver halide emulsion used in the present invention is undergone the gold sensitization. As the gold sensitizer, various gold complexes such as chloroaurate, auric sulfide and auric thiosulfate may be used as a ligand compound used, for example, dimethyl rhodanin, thiocyanate, mercapto tetrazole, mercapto triazole can be mentioned. Preferable amount of use of the gold compound changes depending upon the kind of the emulsion or the compound to be used and various other conditions such as ripening conditions. The amount is usually preferable within the range of $1\times10^{-8}$ to $1\times10^{-4}$ mol, more preferably, it is the range beween $1\times10^{-5}$ and $1\times10^{-8}$ mols per mol of silver halide.

Furthur, reduction sensitization or noble metal sensitization can optionally be employed together with the sulfur sensitization method mentioned above.

As spectral sensitizing dyes suitably used for the blue-sensitive silver halide emulsion of the present invention, any conventionally known compounds can be used. The compound shown by following formulae 1 and 2 is especially useful as the blue light-sensitive sensitizing dye. These dyes can be used either singly or in combination.

Formula 1

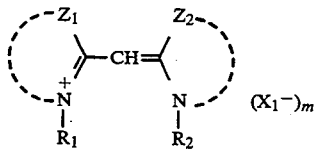

wherein $Z_1$ and $Z_2$ independently represent a group of atoms necessary to complete a thiazole ring, a benzthiazole ring, benzselenazole ring, a naphthothiazole ring or a naphthoselenazole ring; R1 and R2 independently represent an aliphatic group or an aliphatic group containing therein an carboxylic group or a sulfo group provided that at least one of $R_1$ and $R_2$ is an aliphatic group having acarboxylic group or a sulpho group. At least one of R1 and R2 represents an aliphatic group which contains a carboxyl group or the sulfo group and one other represents an aliphatic group. X1 represents an acid anion and m represents an integer of 0 or 1.

Formula 2

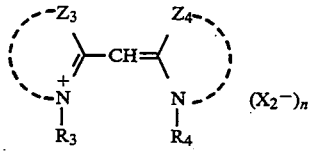

wherein $Z_3$ and $Z_4$ independently represent an atomic group necessary to complete a thiazole ring, a benzthiazole ring or a benzselenazole ring; $R_3$ and $R_4$ independently represent an aliphatic group or an aliphatic group containing therein an carboxylic group or a sulfo group provided that at least one of $R_3$ and $R_4$ is an aliphatic group having a carboxylic group or a sulpho group; $X_2$ represents an acid anion and m represents an integer of 0 or 1.

It is preferable that the blue-sensitive emulsion used in the invention is optically sensitized with a compound represented by the afore-mentioned Formula 1 and a compound represented by Formula 2.

In the above-mentioned Formula 1, the ring represented by $Z_1$ and $Z_2$ may have a substituent at the position other than at the nitrogen atom. The substituent includes, for example, a halogen atom such as chlorine, bromine, and fluorine an alkyl group containing one to four carbon atoms such as methyl, ethyl, propyl; an alkoxy group containing one to four carbon carbons such as methoxy, ethoxy; a hydroxyl group, a carboxyl group, an alkoxycarbonyl group such as ethoxycarbonyl group; a substituted alkyl group such as tri-fluoro methyl group, benzyl group, fenetyl group; an aryl group such as phenyl group; or a substituted aryl group such as p-tolyl group.

$R_1$ and $R_2$ independently represent an aliphatic group having one to eight carbon atoms. They include saturated and unsaturated aliphatic hydrocarbon groups. The carbon chain of the aliphatio hydrocarbon group may be interrupted by a hetero atom such as oxygen, sulfur, nitrogen, and the substituent includes, for example, hydroxyl group, an alkoxy group, an alkylcarbonyloxy group, a phenyl group and a substituted phenyl group, a carboxyl group, a sulfo group. Herein, at least one of $R_1$ and $R_2$ has a carboxyl group or a sulfo group. When both $R_1$ and $R_2$ have a carboxyl group or a sulfo group, one of them may form an intramolecular salt with a cathion such as an alkali ion or an organic base onium ion.

In Formula 2, the ring formed including $Z_3$ and Z4 may have a substituent other than $R_3$ and $R_4$ on the nitrogen atom. The substituent includes, for example, a halogen atom such as chlorine, bromine, and fluorine; an alkyl group containing one to four carbon atoms such as methyl, ethyl, propyl; an alkoxy group containing one to four carbon arbons such as methoxy, ethoxy; a hydroxyl group, a carboxyl group, an alkoxycarbonyl group having one to four carbon atoms such as ethoxycarbonyl group; a substituted alkyl group such as trifluoro methyl group, benzyl group, fenetyl group; an aryl group such as phenyl group; or a substituted aryl group such as p-tolyl group; $R_3$ and $R_4$ respectively represent the same group as $R_1$ and $R_2$ in Formula 1, and at least one of $R_3$ and $R_4$ is an aliphatic group containing a carboxyl group or a sulfo group.

These dyes represented by the Formula 1 and Formula 2 are respectively known compounds and they may easily be synthesized by one skilled in the art with reference to the description in, for example, U.S. Pat. Nos. 3,149,105 and 2,238,231; British Patent No. 742,112 and on page 55 et seq. of "The Cyanine Dyes and Related Compounds" written by M. Harmer and published by Interscience Publisher, New York (1964).

Typical example of the sensitizing dyes useful in the present invention, represented by the Formula 1 and Formula 2 are shown below.

1-1

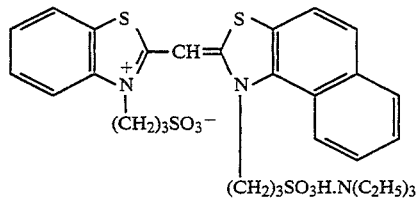

1-2

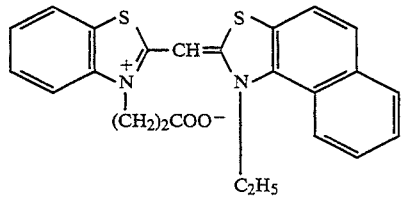

1-3

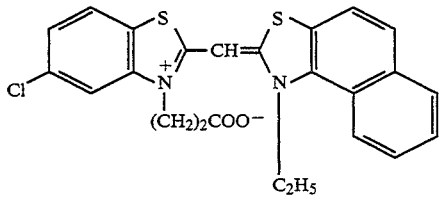

1-4

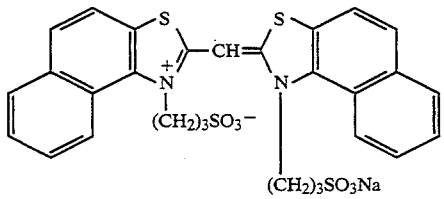

1-5

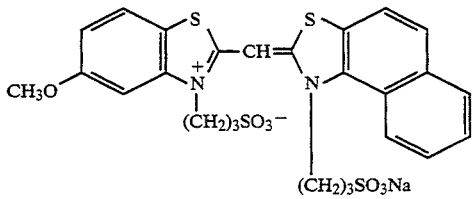

1-6

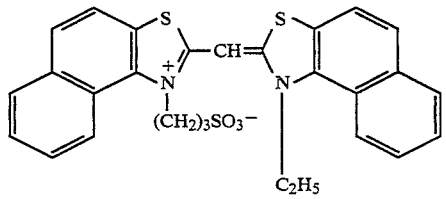

1-7

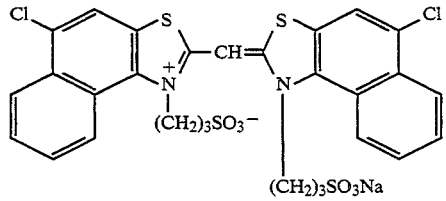

-continued 1-8

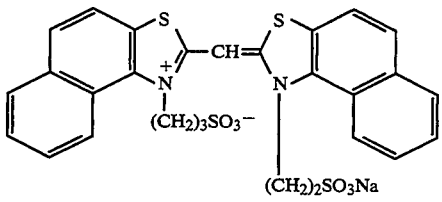

1-9

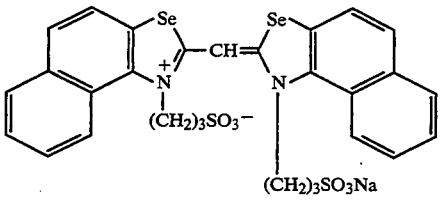

1-10

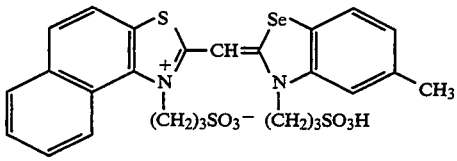

2-1

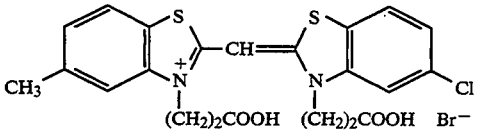

2-2

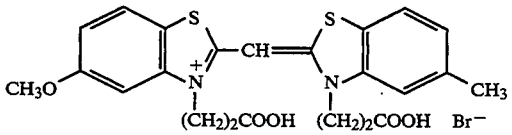

2-3

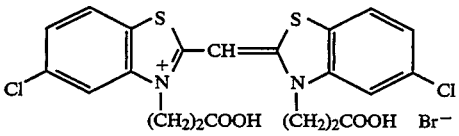

2-4

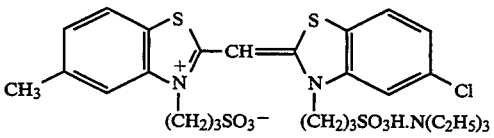

2-5

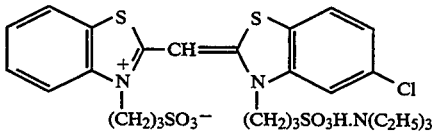

2-6

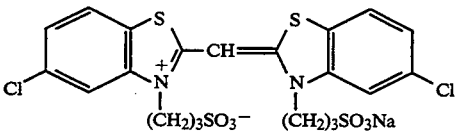

2-7

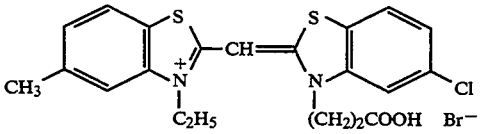

-continued 2-8

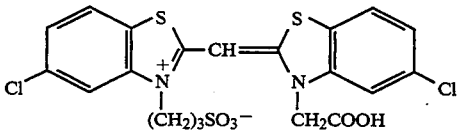

2-9

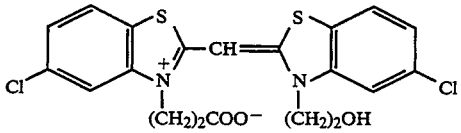

2-10

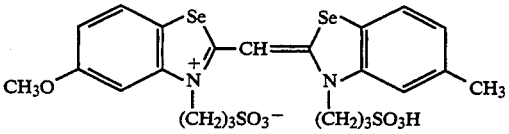

2-11

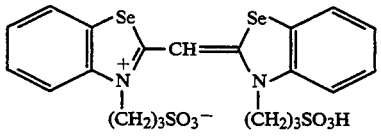

The amount of the blue-sensitizing dye is important for achieving the object of the present invention. It is found that when the amount exceeds $7.0\times10^{-4}$ g/m$^2$ in the lightsensitive material constituted, the gradation variation depending on the variation in temperature was remarkable in the light-sensitive material with a blue-sensitive emulsion layer comprising the mixture emulsion of two kinds or more.

Therefore, the amount of the blue-sensitizing dye may be less than $7.0\times10^{-4}$ g/m$^2$ and may be decided in the light of sensitivity of the emulsion. Practically, the range between $4.0\times10^{-4}$ and $7.0\times10^{31\ 4}$ g/m$^2$ is preferable from the viewpoint of productivity of the automatic printing process.

The sensitizing dye may be added to the emulsion at the arbitary time during preparation of the emulsion, either during or after completion of the precipitation, at the beginning, during or after completion of chemical ripening, or before coating. Also, it may be added either at one time or after dividing it into two or more parts. The coating amount of the blue-sensitive emulsion layer is preferably 0.2 to 0.4 g/m$^2$, more preferably 0.1 to 0.3 g/m$^2$, in terms of silver.

The present invention is preferably applied to a color photographic light-sensitive material, particularly to a color photographic printing material. In such case, the light-sensitive material has a green-sensitive emulsion layer containing a green-sensitizing dye and a red-sensitive emulsion layer containing a red-sensitizing dye further to the blue-sensitive emulsion layer.

As green and red sensitizing dyes, for example, compounds B-1 through B-11 and compounds C-11 through C-14 and D-1 through D-8 described in JP O.P.I. Publication 1-216341(1989) preferably be used. When the light-sensitive silver halide photographic material of the present invention is exposed in the printer using a semiconductor laser, it is necessary to use a sensitizing dye which has light-sensitive in the infrared. As for infra-red sensitizing dye, for example, compounds IRS-1 through IRS-11 described on pp 12–14 of Japanese Patent O.P.I. Publication No. 4-285950(1992) may preferably be used.

Moreover, it is advantageous that supersensiting agents SS-1 through SS-9 described on pages 14 and 15 of the same is used together with these dyes. In the silver halide emulsion of the present invention various known additives such as anti-foggants and stabilizing agents may be used for the purpose of, for example, preventing fog caused during preparation or storage of the silver halide photographic light-sensitive material or during development process.

Example of compound which can be used for such objects. The compound represented by Formula (II) described on page 7 column below in Japanese Patent O.P.I. Publication No. 2-146036(1990) can be mentioned. As specific examples, compounds (IIa-1) through (IIa-8), (IIb-1) through (IIb-7) and 1-(3-methoxyphenyl)-5-mercapto tetrazoles are preferable.

Among these compounds, the compound shown by the following Formula 3 is especially preferable.

Formula 3

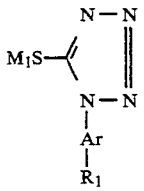

In the formula, Ar represents an aromatic residue and $R_1$ represents a $—OR_2$ group, a $—N(R_3)SO_2R_4$ group or a $—COOM_2$ group; $R_2$ represents a hydrocarbon group having two or more of carbon atoms; $R_3$ represents a hydrogen atom or a hydrocarbon group; and $R_4$ represents a hydrocarbon group and $M_1$ and $M_2$ independently represent a hydrogen atom, an alkali metal atom, the alkaline earth metal atom or an ammonium group.

In Formula 3, Ar represents an aromatic group such as, for example, a phenyl group, a naphthyl group, a piridyl group. These aromatic groups can have a substituent. The effect of the present invention is remarkable when Ar is a phenyl group.

In Formula 3, $R_1$ represents a $—OR_2$ group or a $—N(R_3)SO_2R_4$ group or a $—COOM_2$ group. $R_2$, represents a hydrocarbon group having two or more oh carbon atoms and it includes, for example, an alkyl group such as ethyl group, hexyl group or dodecyl groups or an aryl group such as m-methoxy phenyl group, o-methoxy phenyl group. The effect of the present invention is remarkable when $R_2$ is an alkyl group and is preferable. Moreover, it is preferable that $R_1$ is a $—N(R_3)SO_2R_4$ group or a $—OR_2$ group and $—N(R_3)SO_2R_4$ group is especially preferable.

$R_3$ represents a hydrogen atom or a hydrocarbon group such as methyl group and other groups defined as $R_2$. The effect of the present invention is remarkable when $R_3$ is hydrogen atom.

$R_4$ represents a hydrocarbon group such as, for example, the same hydrocarbon groups as given for $R_3$. The effect of the present invention is remarkable when $R_3$ is an alkyl group and is advantageous.

In Formula 3, $M_1$ and $M_2$ independently represent a hydrogen atom, an alkali metal atom or an alkaline earth metal atom or an ammonium group. As the example of the metallic atom. Sodium, lithium, potassium, calcium can be mentioned. When the metallic atom is of divalent or more, an anion bonds to neutralize the electric charge. The effect of the present invention is remarkable when $M_1$ is a hydrogen atom and is preferable.

The compounds represented by Formula 3 is specifically shown below.

| No. | R |
|---|---|
| | 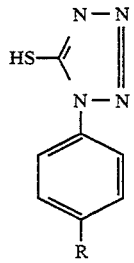 |
| 1 | $—OCH_2CH_3$ |
| 2 | $—O(CH_2)_3CH_3$ |
| 3 | $—O(CH_2)_5CH_3$ |
| 4 | $—O(CH_2)_7CH_3$ |
| 5 | $—O(CH_2)_{11}CH_3$ |
| 6 | 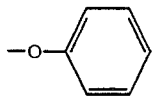 |
| 7 | 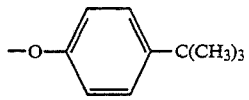 |
| 8 | 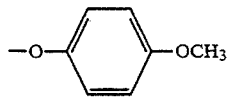 |
| 9 | 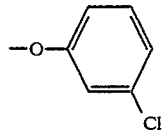 |
| 10 | 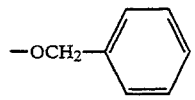 |
| 11 | $—OCH_2CH=CH_2$ |
| 12 | $—OCH_2C\equiv CH$ |
| 13 | $—NHSO_2CH_3$ |
| 14 | $—NHSO_2(CH_2)_3CH_3$ |
| 15 | $—NHSO_2CH(CH_3)_2$ |
| 16 | 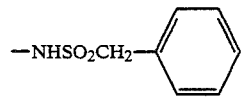 |
| 17 | $—NHSO_2CH_2CF_3$ |
| 18 | $—NHSO_2(CH_2)_3Cl$ |
| 19 | 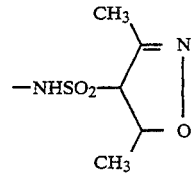 |

-continued

| No. | R |
|---|---|
| 20 | 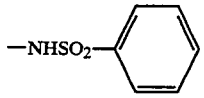 |
| 21 | 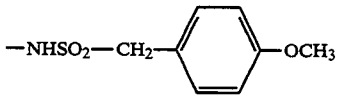 |
| 22 | $-NHSO_2CH_2CH{=}CH_2$ |
| 23 | $-NHSO_2CH_2C{\equiv}CH$ |
| 24 | $-NHSO_2N(CH_3)_2$ |
| 25 | $-NHSO_2(CH_2)_7CH_3$ |
| 26 | $-COOH$ |
| | 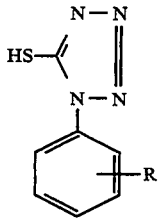 |
| 27 | o-$OCH_2CH_3$ |
| 28 | o-$O(CH_2)_3CH_3$ |
| 29 | 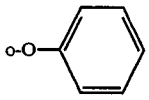 |
| 30 | 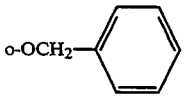 |
| 31 | o-$OCH_2CH{=}CH_2$ |
| 32 | m-$OCH_2CH_3$ |
| 33 | m-$O(CH_2)_5CH_3$ |
| 34 | 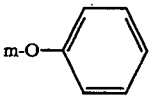 |
| 35 | 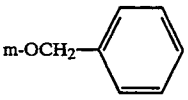 |
| 36 | o-$NHSO_2CH_3$ |
| 37 | o-$NHSO_2(CH_2)_2CH_3$ |
| 38 | 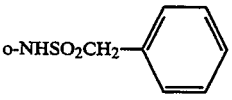 |
| 39 | o-$NHSO_2CH_2CH{=}CH_2$ |
| 40 | m-$NHSO_2CH_3$ |
| 41 | m-$NHSO_2(CH_2)_3CH_3$ |
| 42 | m-$NHSO_2CH(CH_3)_2$ |
| 43 | 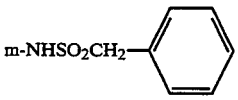 |

-continued

| No. | R |
|---|---|
| 44 | 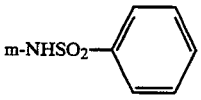 |
| 45 | m-$NHSO_2N(CH_3)_2$ |
| 46 | m-$NHSO_2(CH_2)_7CH_3$ |
| 47 | m-COOH |
| 48 | m-COONa |
| 49 | 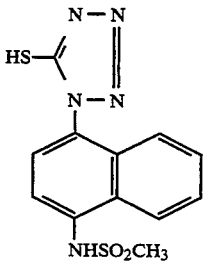 |
| 50 | 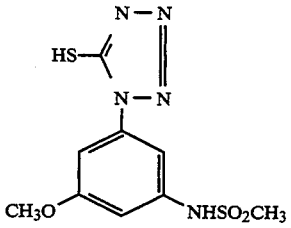 |
| 51 | 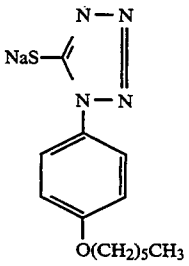 |
| 52 | 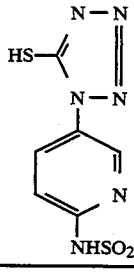 |

These compounds can be prepared with reference to the description disclosed in, for example, Journal of Chemical Society 49,1748 (1927); Journal of Organic Chemistry 39,2469(1965); Japanese Patent O.P.I. Publication No. 50-89034 (1975); Ann. Chim. 44-3, (1954); Japanese Patent Publication No. 40-28496(1965); Chem. Ber., 20,231(1887) and U.S. Pat. No. 3,259,976.

Dye-forming coupler used for the color light-sensitive material according to the present invention is usually selected so that the dye which absorbs light of the emulsion layer photosensitive and the spectrum to each emulsion layer is formed. A magenta dye-forming coupler is used in the green-sensitive emulsion layer; a yellow dye-forming coupler in the blue-sensitive emulsion layer and a cyan dye-forming coupler is used in the red-sensitive emulsion layer. However, depending upon the object the color light-sensitive material may be formed based on the system different from the above-mentioned combination.

In the present invention, acyl acetanilide type couplers can preferably be used as a yellow dye-forming coupler. Among acetanilide yellow dye-forming couplers, a benzoyl acetanilide type and a pivaloyl acetanilide type compound are advantageous.

Hereafter, specific examples of the yellow-dye-forming coupler preferably used in the present invention are given:

YC-1

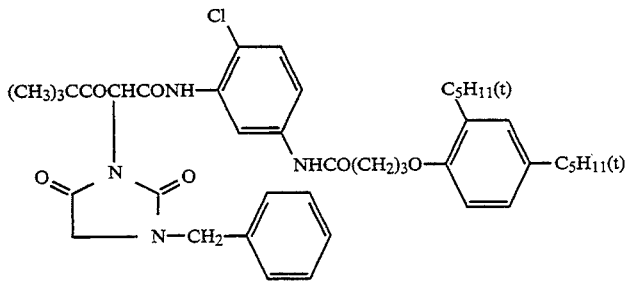

YC-2

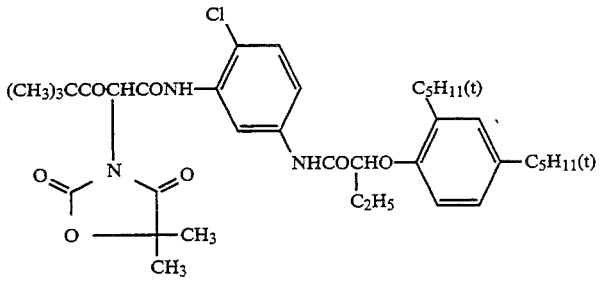

YC-3

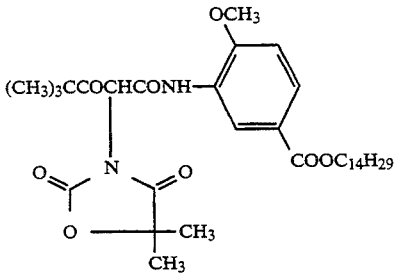

YC-4

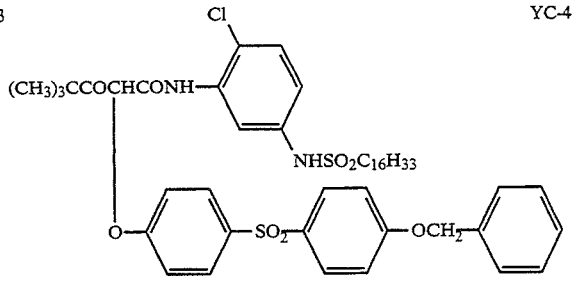

YC-5

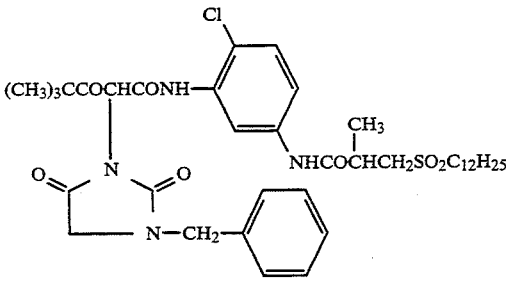

YC-6

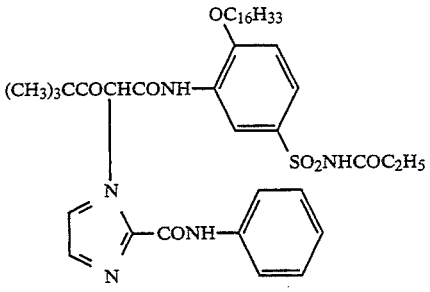

YC-7

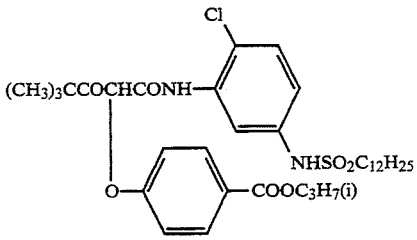

YC-8

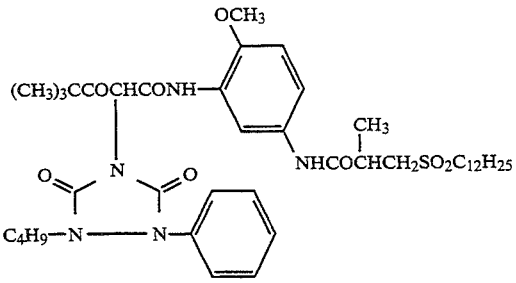

-continued

YC-9

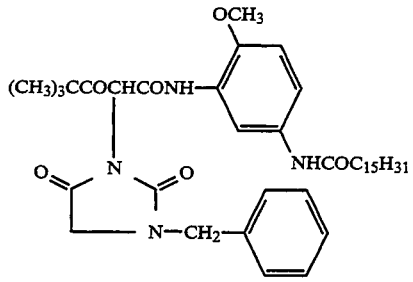

YC-10

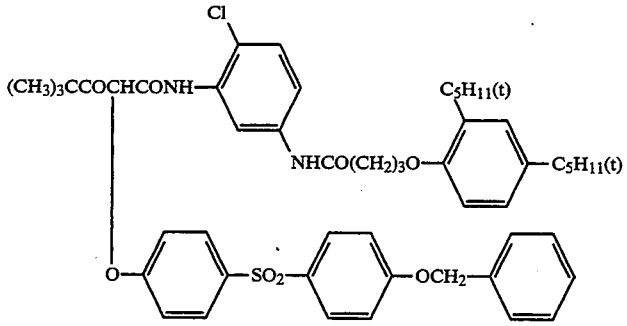

YC-11

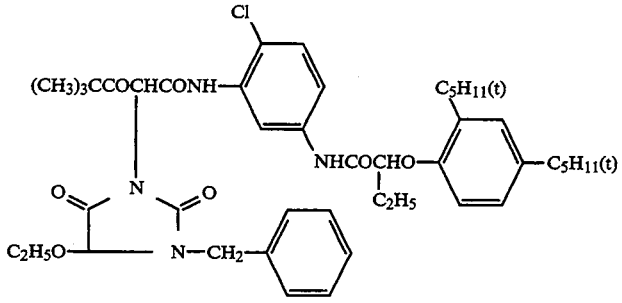

YC-12

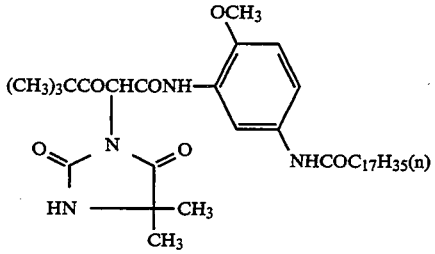

Besides the above-mentioned compounds exemplified compounds Y-1 through Y-146 disclosed on pages 7 through 16 in Japanese Patent O.P.I. Publication No. 63-85631(1988); exemplified compounds Y-1 through Y-98 disclosed on pages 6 through 10 in Japanese Patent O.P.I. Publication No. 63-97951(1988); exemplified compounds Y-1 through Y-24 disclosed on pages 18 through 20 in Japanese Patent O.P.I. Publication No. 1-156748(1989); exemplified compounds I-1 through I-50 disclosed on pages 4 through 7 in Japanese Patent O.P.I. Publication No. 2-298943(1990) and exemplified compounds Y-1 through Y-48 disclosed on pages 114 through 120 in Japanese Patent O.P.I. Publication No. 62-215272(1987) can also be used.

Other than yellow dye-formig couplers used in the silver halide light-sensitive photographic material of the present invention, magenta coupler having its spectral absorption maximum in the wavelength range between 500 nm and 600 nm and cyan coupler having its spectral absorption maximum in the wavelength range between 600 nm and 750 nm are well known in the art.

As magenta coupler which can be preferably used in the color light-sensitive material according to the present invention, Exemplified Compounds 1 through 223 disclosed on pages 18 through 32 in Japanese Patent O.P.I. Publication No. 62-66339(1987); Exemplified Compounds M-1 through M-223 disclosed on pages 5 and 6 in Japanese Patent O.P.I. Publication No. 2-100048(1989); Exemplified Compounds M-1 through M-223 disclosed on pages 5 and 6 in Japanese Patent O.P.I. Publication No. 2-100048 (1989); Exemplified Compounds M-1 through M-30 disclosed on pages 9 through 26 in Japanese Patent O.P.I. Publication No. 3-214155 (1991) and Exemplified Compounds M-1 through M-47 disclosed on pages 104 through 114 in Japanese Patent O.P.I. Publication No. 62-215272(1987); can be mentioned.

As cyan coupler which can be preferably used in the silver halide light-sensitive photographic material of the present invention, for example, couplers represented by the general Formulae (C-I) and (C-II) disclosed in Japanese Patent O.P.I. Publication No. 4-114154(1992) can be mentioned. To be more specific, Exemplified compounds CC-1 through CC-9 disclosed on pages 18 through 21 in the same may be mentioned.

In the light-sensitive material of the present invention, various dyes having absorption in various wavelength resions can be used for the purposes of anti-irradiation and anti-halation. Any well-known compounds can be used fo this purpose. Especially, as a dye which has absorption in the visible spectral region, dyes AI-1 through AI-11 disclosed on pages 117 and 118 in Japanese Patent O.P.I. Publication No. 3-251840(1991) are preferable. As infra-red rays absorption dyes, those dyes represented by the general Formulae (I), (II) and (III) on column 2 below on page 2 of Japanese Patent O.P.I. Publication No. 1-280750 are preferable in view of absorption characteristics and less photographic effects upon the silver halide emulsion and stains by the residual dye. As specific examples, Exemplified Compounds (1) through (45) on the leftcolumn below on pages 3 thru page 5 can be mentioned.

When a dye-forming coupler used for the silver halide light-sensitive photographic material of the present invention is added to photographic emulsion by oil protect emulsification process, after dissolving a dye-forming coupler in a warer-immiscible high boiling point organic solvent and, if necessary, together with a low boiling point organic solvent and an water-soluble organic solvent, the mixture is emulsion-dispersed in a hydrophilic binder such as gelatin using a surface active agent to form an oil in water type dispersion. As dispersing means, a stirring machine, a homogenizer, a colloid mill, a flow jet mixer, and a ultrasonic homogenizer can be used. A step of eliminating the low boiling point organic solvent may be put during or after emulsification process. As high boiling point organic solvent which can be used to dissolve coupler and to disperse the dye-forming coupler, phthalic acid esters such as di-octyl phosphate and phosphates such as tri-cresyl phosphate can be mentioned. Among these, phthalic acid ester can exert the effect of the present invention more effectively. Moreover, in stead of the method of using the high boiling point organic solvent, a method in which a coupler and a certain polymeric compound, which is immiscible with water and soluble in the organic solvent, are dissolved, if necessary, in a low boiling point organic solvent and/or in a water-soluble organic solvent and then the mixture is emulsified by various dispersion means and using a surfactant in a hydrophilic binder such as aqueous gelatin solution, may also be employed. As a polymer which is soluble in the organic solvent and insoluble in water, water-insoluble used at this time, poly(N-t-butyl acrylic amide) can be mentioned. For the purpose of shifting the absorption wave length of the dye, compound (d-11), (A'-1) disclosed on pages 33 and 35 of Japanese Patent O.P.I. Publication No. 4-114154(1992) can also be used.

Moreover, the fluorescent dye-releasing compound disclosed in U.S. Pat. No. 4,774,187 may also be used.

As coating amount of coupler, there is especially no limitation, if an enough, density can be obtained. The coupler is used within $1\times10^{-3}$ to 5 mols per mol of silver halide and, more preferably, in the ranges between $1\times10^{-2}$ to 1 tool.

In the silver halide light-sensitive photographic material of the present invention, it is advantageous to use gelatin as a binder, however, if necessary, other hydrophilic colloids such as gelatin derivatives graft polymer of gelatin and synthesic high polymers, hydrophilic materials such as protein other than gelatin, sach as sugar derivatives, cellulose derivatives, and other hydrophilic homopolymers or copolymers can optionally be used.

As a reflective support used in the present invention any conventional material can be used. It includes, for example, white pigment containing-polyethylene coated paper, baryta paper, vinyl chloride sheet, and white pigment containing-polyethylene terephthalate support. Among these, a support having polyolefine resin layer containing a white pigment is preferable.

As white pigments used for the reflective support used in the present invention, inorganic/or organic white pigments preferably, inorganic white pigments can be used. For example, sulfates of alkali earth metal such as barium sulfates; carbonates of alkaline earth metal such as calcium carbonate; silicas such as mote silicic acid and synthetic silicates; silicic acid calcium, alumina, alumina hydrate, titanium oxide zinc oxide, talc, and clay can be mentioned.

Among these, preferable white pigments are barium sulfate and titanium oxide. Amount of white pigments comprised in the water resistive resin layer on the surface of the reflective support of the present invention, 10% or more by weight as the content in water resistance resin layer is preferable. The content of more than 13% by weight is more preferable and 15% or more by weight is especially preferable.

Dispersion degree of the white pigment in the water resistive layer can be determined by the method described in Japanese patent O.P.I. Publication No. 2-28640(1990). The dispersion degree of white pigments is preferable to 0.20 or less as the coefficient of variation of the description of the publication, more preferably 0.15 or less and 0.10 or less is most preferable when measured in this method.

If necessary, the silver halide light-sensitive photographic material of the present invention may ungergo any suitable surface treatment such as corona discharge, ultraviolet ray irradiation, a flame treatment, etc. on the surface of the support. Afterwards, the photographic layer is coated on the support directly or through one or more subbing layers, which are usually provided in order to improve various surface properties of the support e.g., adhesion property, anti-static property, dimensional stability, abrasion resistance, hardness, anti-halation, and anti-friction characteristics.

Upon coating the photographic layers including the silver halide emulsion, a thickener may be used to improve the coating performance. As the coating method, extrusion coating and the curtain coating, whereby two or more kinds of photographic layers can be coated simultaneously, are especially useful.

In the processing of the silver halide light-sensitive photographic material of the present invention as the color developing agent used for the color developer, various aminophenol and p-phenylene diamine compounds, which are widely used in the field of color photography, are used. Especially, aromatic primary amine type color developing agent is preferably used.

As the aromatic primary amino developing agent, the following compounds can be mentioned:

(1) N,N-dimethyl-p-phenylenediamine hydrochloride
(2) N-methyl-p-phenylenediamine hydrochloride
(3) 2-amino-5-(N-ethyl-N-dodecylamino)toluene (4) N-ethyl-N-(β-methansulfonamide-ethyl)-3-methyl-4-(aminoaniline) sulfate (5) N-ethyl-N-(β-hydroxyethyl-3-methyl-4-aminoaniline sulfate (6) 4-aminoh-3-methyl-N,N,-diethyl aniline (7) 4-amino-N-(β-methoxyethyl)-N-ethyl-3-methyl aniline p-toluenesulfonate (8) 4-amino-N-ethyl-N-(γ-hydroxypropyl)-3-methyl aniline p-toluenesulfonate It is preferable that these color developing agents are used within the range between $1\times10^{-3}$ and $2\times10^{-1}$ mols per liter of the developer and, more preferably, within the range between $5\times10^{-3}$ and $2\times10^{-1}$ mols.

To the color developer, various known developer additives can be added in addition to the above-mentioned color developing agent. These additives include, for example, development retarder having pH buffering action such as alkali agent, chloride ion, and benztriazole compounds, preservatives, and chelating agent. As the alkali agent used for the color developer in the present invention, for example, potassium carbonate, potassium borate and sodium tri-phosphate are included. Farther, for the purpose of pH adjustments, sodium hydroxide, potassium hydroxide can be used. The pH value of the color developer is usually between the range 9 to 12 and, more preferably, between 9.5 to 11.

For the purpose of development inhibition, halide is usually used. In a rapid processing due to the necessity for the development to complete in a very short time, chloride ion such as potassium chloride, sodium chloride are usually used. The amount of the chloride ion to be used is approximately not less than $3.0\times10^{-2}$ mols and, more preferably, between the range of $4.0\times10^{-2}$ and $5.0\times10^{-1}$ mols per liter of the developer.

The bromide ion can be used at an optional amount as far as it does not jeopardise object of the present invention, usually not more than $1.0\times10^{-3}$ mols per liter of the color developer and, more preferably, not more than $5.0\times10^{-4}$ mols is preferable.

As a preservative, hydroxylamine derivatives except hydroxyl amine, hydroxamic acids, hydrazines, hydrazidaminoketons, saccharoids, monoamines, diamines, polyamines, quaternary ammonium salts, nitroxy radicals, alcohols, oximes, diamido compounds, cyclic a mine compounds are especially effective. Dialkyl hydroxylamines such as diethylhydroxylamine; alkanolamines such as triethanolamine are particularly preferable.

As chelating agent used in the color developer, compounds such as aminopolycarboxylic acids, aminopolysulfonic acids, alkylsulfonic acids and phosphonocarboxylic acids are used. ethylenediamine-tetraacetic acid, nitrylotriacetic acid, diethylenetriaminepentaacetic acid and 1-hydroxyethylidene-1,1-disulfonic acid are particularly preperable.

Developing temperature is ordinary 15° C. or more, generally within the range of from 20° to 50° C. For rapid processing, a temperature of 30° C. or more is preferable.

Time for color development is ordinary 10 seconds to 4 minutes. In the rapid processing, a time of 10 seconds to 1 minute is preferable. When more rapid processing id required, it is preferable to perform the development for a time of 10 to 30 seconds.

In the processing, a method may be used, in which the color developer is continuously replenished accompanied with the running of the processing. In such case, it is preferable considering environmental pollution by overflow of the developer that the replenishing amount to the developer is decided so as that the developer is not overflown during processing. The preferable replenishing amount of the developer is concretely 20 to 60 ml/m$^2$ of processed photographic material.

The photographic light-sensitive material of the invention is subjected to bleaching and fixing treatment after the development. The bleaching treatment may be carried out with the fixing treatment at the same time. Washing is ordinary applied to the photographic material after fixing. Stabilizing treatment may be applied instead of the washing. For processing the photographic material of the invention, a roller-transport type processor, in which the photographic material is transported by rollers quipped in processing tanks thereof, or an endless belt type processor, in which the photographic material is fixed on an endless belt and transported by the belt, may be used. Further, a processor having processing tanks in a form of slit may also be used, in which the photographic material is transported in the slit with a processing solution supplied to the slit.

EXAMPLE

Example 1

High density polyethylene layers were laminated on the both surfaces of a raw having a weight of 180 g/m$^2$ to make a reflective paper support. In the laminated layer provided on the side of the support, on which an emulsion layer to be coated, surface-treated anatase type titanium oxide is dispersed in a ratio of 15 weight percent. On the reflective support, layers each having the following composition were coated to prepare Samples 101 to 130. The coating solutions were prepared as follows.

In 60 ml of ethyl acetate 26.7 g of yellow coupler Y-1, 10 g of dye image stabilizer ST-1, 6.67 g of dye image stabilizer ST-2, o, 67 g of additive HQ-1 and 6.67 g of high-boiling solvent NDP were added and dissolved. The solution was dispersed in 220 ml of 10 % gelatin solution containing 9.5 ml of 15 % solution of surfactant SU-1 by an ultrasonic homogenizer to prepare a yellow coupler dispersion. The dispersion is mixed with a blue-sensitive silver halide emulsion containing 8.68 g of silver which was prepared in the following conditions. Further, 6.7 ml of 5 % solution anti-irradiation dye and compounds and gelatin given in Table 3 were added to the solution to prepare a coating solution of the first layer. Coating solutions each to be coated as the second to seventh layers were prepared in the manner similar to that in the preparation of the first layer coating solution. Compounds H-1 and H-2 were added as hardeners to the second and forth layers, respectively. Surfactants SU-2 and SU-3 were added to control the surface tension of coating solution.

The compositions of layers were as follows:

| Layer | Composition | Added amount (g/m$^2$) |
|---|---|---|
| 7th Layer (Protective layer) | Gelatin | 1.00 |
| | F-1 | 0.002 |
| 6th layer (UV absorbing layer) | Gelatin | 0.40 |
| | UV absorbent UV-1 | 0.10 |
| | UV absorbent UV-2 | 0.04 |
| | UV absorbent UV-3 | 0.16 |
| | Anti-stain agent HQ-1 | 0.01 |
| | DNP | 0.20 |

-continued

| Layer | Composition | Added amount ($g/m^2$) |
|---|---|---|
| | PVP | 0.03 |
| | Anti-irradiation dye AI-1 | 0.02 |
| 5th layer (Red-sensitive layer) | Gelatin | 1.30 |
| | Red-sensitive silver chloro-bromide emulsion Em-R1 | 0.21 |
| | Cyan coupler C-1 | 0.26 |
| | Cyan coupler C-2 | 0.09 |
| | Dye image stabilizer ST-1 | 0.20 |
| | Anti-stain agent HQ-1 | 0.01 |
| | HBS-1 | 0.20 |
| | DOP | 0.20 |
| 4th layer (UV absorbing layer) | Gelatin | 0.94 |
| | UV absorbent UV-1 | 0.28 |
| | UV absorbent UV-2 | 0.09 |
| | UV absorbent UV-3 | 0.38 |
| | Anti-stain agent HQ-1 | 0.03 |
| | DNP | 0.40 |
| | Anti-irradiation dye AI-2 | 0.01 |
| 3rd layer (Green-sensitive layer) | Gelatin | 1.40 |
| | Green-sensitive silver chloro-bromide emulsion Em-G1 | 0.17 |
| | Magenta coupler M-1 | 0.35 |
| | Dye image stabilizer ST-3 | 0.15 |
| | Dye image stabilizer ST-4 | 0.15 |
| | Dye image stabilizer ST-5 | 0.15 |
| | DNP | 0.20 |
| 2nd layer | Gelatin | 1.20 |
| | Anti-stain agent | 0.12 |
| | DIDP | 0.15 |
| | Anti-irradiation dye AI-3 | 0.01 |
| 1st layer (Blue-sensitive layer) | Gelatin | 1.20 |
| | Blue-sensitive silver chloro-bromide emulsion shown in Table | 0.26 |
| | Yellow coupler Y-1 | 0.80 |
| | Dye image stabilizer ST-1 | 0.30 |
| | Dye image stabilizer ST-2 | 0.20 |
| | Anti-stain agent HQ-1 | 0.02 |
| | DNP | 0.20 |
| Support | Polyethylene-laminated paper | |

In the above, the amount of silver halide emulsion is described in terms of silver.

The addenda used in each layer were as follows:

H-i: Tetrakis(viylsulfonylmethyl)methane

H-2: Sodium 2,4-dichloro-6-hydroxy-s-triazine

SU-1: Sodium tri-iso-propylnaphthalenesulfonate

SU-2: Sodium di-(2-ethylhexyl) succinate

SU-3: Sodium di-(2,2,3,3,4,4,5,5-octafluropentyl) sulfosuccinate

DOP: di-octyl phthalate

DNP: di-nonyl phthalate

DIDP: Di i-decyl phthalate

PVP: Polyvinyl pyrrolidone

HBS-1: 1-4-(p-toluene sulfonamido)benzene

HBS-2:1 mixture of tri-(2-ethylhexyl)phosphate and tri-cresyl phosphate with volume ratio of 2:1

HQ-1: 2,5-di-t-octyl hydroquinone

HQ-2: 2-hexadecyl-5-methyl hydroquinone

F-1: 5-chloro-2-methyl-iso-thiazoline-3-on

Y-1

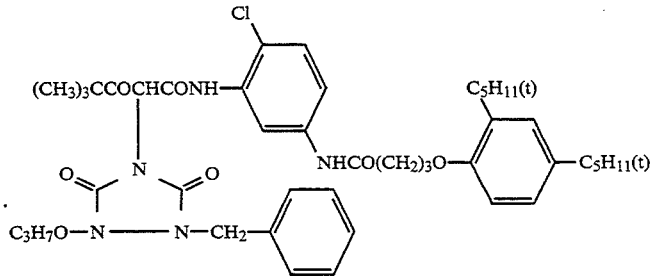

M-1

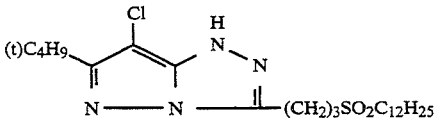

C-1

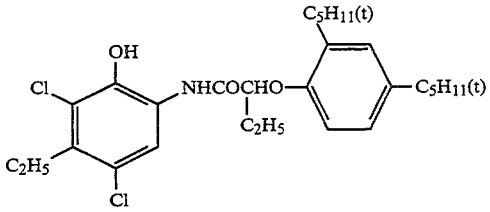

C-2

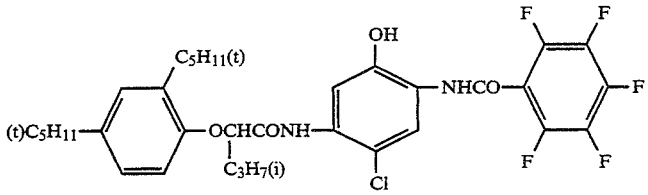

ST-1

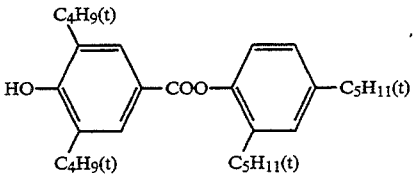

ST-2

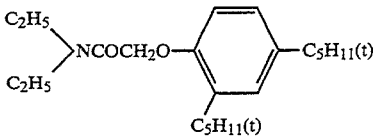

-continued
ST-3
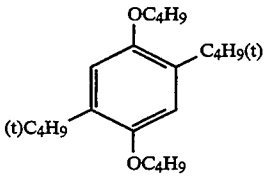
ST-4
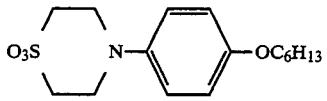
ST-5
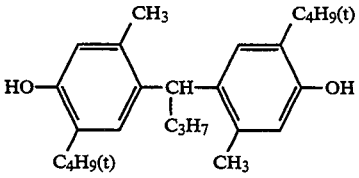
UV-1
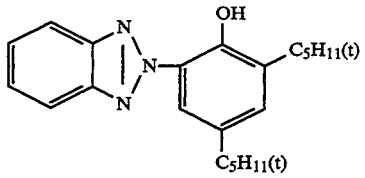
F-1
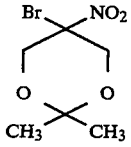
UV-2
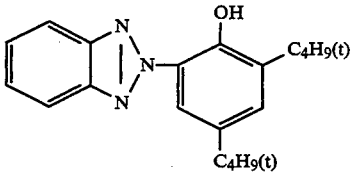
UV-3
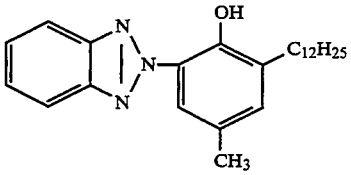
AI-1
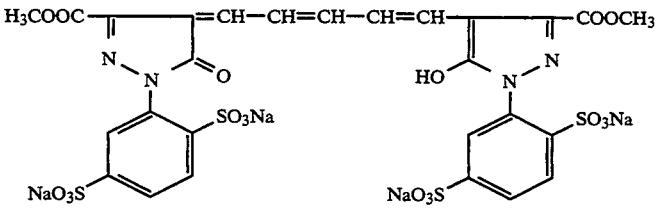
AI-2
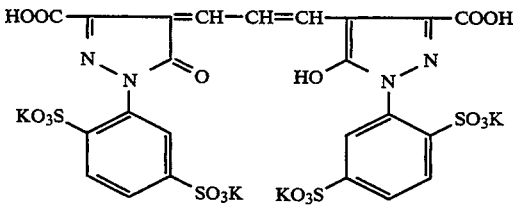
AI-3
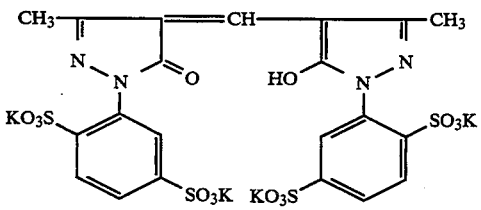
BS-1
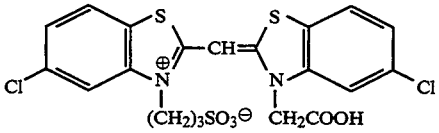
GS-1
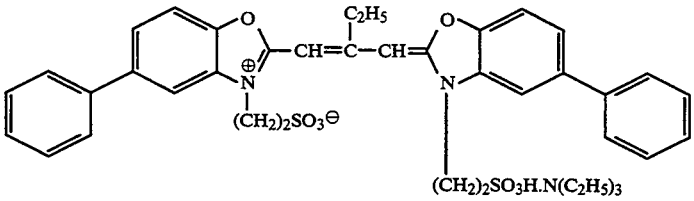

-continued

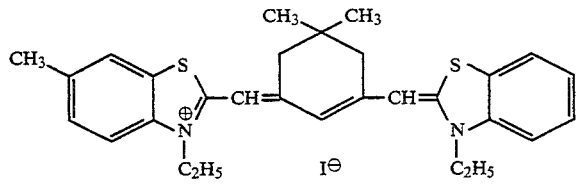

RS-1

Preparation of Blue-Sensitive Silver Halide emulsion

Into 1000 ml of 2% aqueous gelatin solution, added simultaneously the following Solution A and Solution B, of which temperature was kept at 40° C., taking 30 minutes and controlling pAg and pH of the mixture at 6.5 and 3.0, respectively.

Then Solution C and Solution D were added simultaneously to the mixture taking 180 minutes and controlling pAg and pH of the mixture at 7.3 and 5.5, respectively. And this time, pAg control was carried out according to the method discribed in Japanese Patent O.P.I. Publication No. 59-45437(1984) and using aqueous solutions of sulfuric acid and sodium hydroxide.

| | |
|---|---|
| <Solution A> | |
| Sodium chloride | 3.42 g |
| Potassium bromide | 0.07 g |
| Add water to make the total volume | 200 ml |
| <Solution B> | |
| Silver nitrate | 10 g |
| Add water to make the total volume | 200 ml |
| <Solution C> | |
| Sodium chloride | 102.7 g |
| Potassium bromide | 2.10 g |
| Add water to make the total volume | 600 ml |
| <Solution D> | |
| Silver nitrate | 300 g |
| Add water to make the total volume | 600 ml |

After completion of addition, the mixture was desalted using 5% aqueous solution of Demol N (Product of Kao Atlas Co.) and 20% aqueous solution of the magnesium sulfate and mixed with an aqeuous gelatin solution. Thus, mono-dispersed cubic grain emulsion EMP-1 of which average grain size was 0.85 μm, coefficient of grain isze distribution variation (S/R), 0.07 and the silver chloride content was 99.0 mol % was obtained.

Further five kinds of blue-sensitive emulsions EMP-2 to EMP-7 were prepared having each the average grain size of 0.55 μm, 0.65 μm, 0.75 μm, 0.82 μm, 0.90 μm and 0.95 μm. respectively. These emulsions are prepared in the manner similar to the above-mentioned blue-sensitive emulsion having 0.85 μm of grain size except that the adding time of Solutions A and B and Solutions C and D were changed to obtaine 10, 20, 24, 27, 35 and 40 minutes to the prescribed grain size. Thus obtained the blue-sensitive emulsions were mixed as described in Table and used for forming the blue-sensitive emulsion layer of the samples.

The emulsions EMP-1 to EMP-7 each were divided to 5 parts and underwent chemical ripeninga at 50° C., for optimum times using the following compounds, to obtain a blue-sensitive silver halide emulsions Em-B1 to Em-B7.

Emulsion EMP-1 to EMP-7 were each divided to 5 parts and chemicall sensitized with the following compounds to obtaine blue-sensitive emulsions Em-B1-(a)-(e) to Em-B7(a)-(e).

| | |
|---|---|
| Sodium thiosulfate | 0.8 mg/mol AgX |
| Chloroaurate | 0.5 mg/mol AgX |
| STAB-1 (stabilizer) | $6 \times 10^{-4}$ mol/mol AgX |
| BS-1 (sensitizing dye) | Prescribed amount |

The amounts of BS-1 added to the emulsions marked (a) through (e) were each 0.235 mg, 0.282 mg, 0.329 mg, 0376 mg and 0.423 mg per mol of silver so that the coating amount of the dye to be 0.5, 0.6, 0.7, 0.8 and 0.9 mg/m$^2$ after each of the emulsions was coated as a blue-sensitive emulsion layer of sample as shown in Table 1 emulsion.

Thus obtained emulsions were classified by grouping those each having the same amount of the dye. Two kinds of emulsions were selected from the same group and mixed to form a blue-sensitive emulsion layr of a sample in the ratio of 4:6 or 3:7 as shown in Table 1.

Preparing Green-Sensitive Silver Halide Emulsion

Silver halide emulsion EPM-2 having average grain size 0.43 μm, a coefficient of variation (S/R) of 0.07 and a silver chloride content of 99.0 mol % was obtained in the manner similar to that in the preparation of EPM-1 but changing the time of addition of Solution A, Solution B, Solution C and Solution D.

Then, emulsion EMP-2 underwent chemical ripening at 50° C., for 120 minutes and using the following compounds, to obtain a blue-sensitive silver halide emulsion Em-G1.

| | |
|---|---|
| Sodium thiosulfate | 1.5 mg/mol AgX |
| Chloroaurate | 1.0 mg/mol AgX |
| STAB-1 (stabilizer) | $6 \times 10^{-4}$ mol/mol AgX |
| GS-1 (sensitizing dye) | $4 \times 10^{-4}$ mol/mol AgX |

Preparing Red-Sensitive Silver Halide Emulsion

A mono-disperse cubic silver halide emulsion EMP-3 having an average grain size of 0.50 μm, a coefficient of variation (S/R) of 0.087 and a silver chloride content of 99.0 mol %, was obtained in the similar to that in the preparation of EPM-1 but changing the time of addition of Solution A, Solution B, Solution C and Solution D.

Then, the emulsion EMP-3 underwent chemical ripeninga at 60° C., for 90 minutes and using the following compounds, to obtain a red-sensitive silver halide emulsion Em-R1.

| | |
|---|---|
| Sodium thiosulfate | 1.8 mg/mol AgX |
| Chloroaurate | 2.0 mg/mol AgX |
| STAB-1 (stabilizer) | $6 \times 10^{-4}$ mol/mol AgX |
| RS-1 (sensitizing dye) | $1 \times 10^{-4}$ mol/mol AgX |

Samples 1 to 33 were prepared using thus obtained emulsions. In the blue-senitive layers of the samples, two kinds of the blue-senstive emulsions each having different average grain size were used in the ratio dsescribed in Table.

Sensitometry

The sample was subjected to the sensitometry by exposing through an optical wedge by the conventional method and processing by the following processing step. The sensitivity was defined as the reciprocal of the exposure amount necessary to form an image density of 0.75. The gradation was defined as the average gradient between densities 0.5 to 1.0 on the characteristic curve. The fog was defined by the density of an unexposed sample which was processed in the following process in that only the color development in the processing step at the time of two times 90 seconds.

Temperature Variation at at the Time of Exposure

The atmosphere of the circumference of the sensitometer for the sensitometry and the sample has been changed. Humidity was constantly made 50%, temperature was changed to 3 steps of 10° C., 20° C., 30° C., and the sensitometry was done and the change of the gradation of the sample depending on the temperature was examined.

| Processing step | Processing step<br>Processing temperature | Time |
|---|---|---|
| Color development | 35.0 ± 0.3° C. | 45 seconds |
| Bleaching fixation | 35.0 ± 0.5° C. | 45 seconds |
| Stabilization | 30–34° C. | 90 seconds |
| Drying | 60–80° C. | 60 seconds |

The composition of the photographic processing solution is shown below.

| Color developer | |
|---|---|
| Pure water | 800 ml |
| Triethylene diamine | 2 g |
| Diethylene glycol | 10 g |
| Potassium bromide | 0.01 g |
| Potassium chloride | 3.5 g |

-continued

| | |
|---|---|
| Potassium sulfite | 0.25 g |
| N-ethyl-N-(β-methanesulfonamidoethyl)-3-methyl-4-aminoaniline sulfate | 6.0 g |
| N,N-diethyl hydroxyl amines | 6.8 g |
| Triethanolamine | 10.0 g |
| Sodium diethylenetriaminepentaacetate | 2.0 g |
| Stilbene fluorescent brightening agent (4,4'-diamino sulfonic acid derivative) | 2.0 g |
| Potassium carbonate | 30 g |

The whole quantity is assumed one liter adding water and it is adjusted to pH=10.10.

| Bleach-fixer | |
|---|---|
| Ferric ammonium diethylenetriaminepentaacetate dihydrate | 65 g |
| Diethylenetriaminepentaacetic acid | 3 g |
| Ammonium thiosulfate (70% aqueous solution) | 100 ml |
| 5-amino-1,3,4-thiadiazole-2-thial | 2.0 g |
| Ammonium sulfate (40% aqueous solution) | 27.5 ml |

The whole quantity is assumed one liter adding water and it is adjusted with potassium carbonate or glacial acetic acid to pH=6.5.

| Stabilizing solution | |
|---|---|
| Ortho-phenylphenol | 1.0 g |
| 5-chloro-2-methyl-4-isothiazoline-3-on | 0.02 g |
| 2-methyl-4-isothiazoline-3-on | 0.02 g |
| Diethylene glycol | 1.0 g |
| Fluorescent brightening agent (Chipanol SFP) | 2.0 g |
| 1-hydroxyethylidene-1,1-diphosphonic acid | 1.8 g |
| $BiCl_3$ (45-% aqueous solution) | 0.65 g |
| $MgSO_4$ $7H_2O$ | 0.2 g |
| PVP (polyvinyl pyrrolidone) | 1.0 g |
| Ammonia water (ammonium hydroxide 25% aqueous solution) | 2.5 g |
| Tri-sodium nitriloacetate | 1.5 g |

The whole quantity is assumed one liter adding water and it is adjusted with sulfuric acid or the ammonia water to pH=7.5.

The image density formed on the processed sample was measured with blue light by PDA-65 densitometer (product of Konica Corp.). Following Table 1 showed the result.

TABLE 1

| Sample No. | Average grain size<br>Emulsion A | Emulsion B | Mixing ratio of Emulsion A and B | Coating amount of blue-sensitizing dye ($10^{-4}$ g/m$^2$) | Relative Sensitivity | Gradation | Gradation by exposure at various temperature<br>10° C. | 20° C. | 30° C. | Remarks |
|---|---|---|---|---|---|---|---|---|---|---|
| 1 | 0.55 μm | 0.85 μm | 6:4 | 9.0 | 94 | 2.10* | 2.03 | 2.11 | 2.45 | Comparison |
| 2 | 0.55 μm | 0.85 μm | 6:4 | 8.0 | 88 | 2.12* | 2.02 | 2.13 | 2.41 | Comparison |
| 3 | 0.55 μm | 0.85 μm | 6:4 | 7.0 | 80 | 2.09* | 2.01 | 2.10 | 2.16 | Comparison |
| 4 | 0.55 μm | 0.85 μm | 6:4 | 6.0 | 72 | 2.10* | 2.00 | 2.08 | 2.11 | Comparison |
| 5 | 0.55 μm | 0.85 μm | 6:4 | 5.0 | 63 | 2.05* | 2.00 | 2.02 | 2.07 | Comparison |
| 6 | 0.65 μm | 0.85 μm | 6:4 | 9.0 | 114 | 2.65 | 2.48 | 2.67 | 3.06 | Comparison |
| 7 | 0.65 μm | 0.85 μm | 6:4 | 8.0 | 107 | 2.73 | 2.54 | 2.70 | 2.95 | Comparison |
| 8 | 0.65 μm | 0.85 μm | 6:4 | 7.0 | 99 | 2.80 | 2.78 | 2.81 | 2.84 | Invention |
| 9 | 0.65 μm | 0.85 μm | 6:4 | 6.0 | 93 | 2.71 | 2.74 | 2.74 | 2.75 | Invention |
| 10 | 0.65 μm | 0.85 μm | 6:4 | 5.0 | 81 | 2.70 | 2.69 | 2.71 | 2.75 | Invention |
| 11 | 0.75 μm | 0.85 μm | 6:4 | 9.0 | 122 | 3.05 | 2.87 | 3.06 | 3.60 | Comparison |
| 12 | 0.75 μm | 0.85 μm | 6:4 | 8.0 | 115 | 3.11 | 2.99 | 3.14 | 3.55 | Comparison |
| 13 | 0.75 μm | 0.85 μm | 6:4 | 7.0 | 108 | 3.15 | 3.15 | 3.17 | 3.21 | Invention |
| 14 | 0.75 μm | 0.85 μm | 6:4 | 6.0 | 100 | 3.20 | 3.13 | 3.19 | 3.23 | Invention |
| 15 | 0.75 μm | 0.85 μm | 6:4 | 5.0 | 93 | 3.12 | 3.10 | 3.11 | 3.17 | Invention |
| 16 | 0.75 μm | 0.85 μm | 6:4 | 4.0 | 85 | 3.07 | 3.02 | 3.06 | 3.10 | Invention |
| 17 | 0.82 μm | 0.85 μm | 6:4 | 9.0 | 129 | 3.72 | 3.34 | 3.69 | 4.05 | Comparison |
| 18 | 0.82 μm | 0.85 μm | 6:4 | 8.0 | 120 | 3.68 | 3.45 | 3.70 | 4.11 | Comparison |
| 19 | 0.82 μm | 0.85 μm | 6:4 | 7.0 | 114 | 3.70 | 3.60 | 3.65 | 3.82 | Comparison |
| 20 | 0.82 μm | 0.85 μm | 6:4 | 6.0 | 105 | 3.75 | 3.66 | 3.72 | 3.81 | Comparison |
| 21 | 0.82 μm | 0.85 μm | 6:4 | 5.0 | 100 | 3.60 | 3.56 | 3.63 | 3.72 | Comparison |

TABLE 1-continued

| Sample No. | Average grain size Emulsion A | Average grain size Emulsion B | Mixing ratio of Emulsion A and B | Coating amount of blue-sensitizing dye ($10^{-4}$ g/m$^2$) | Relative Sensitivity | Gradation | Gradation by exposure at various temperature 10° C. | 20° C. | 30° C. | Remarks |
|---|---|---|---|---|---|---|---|---|---|---|
| 22 | 0.65 μm | 0.90 μm | 7:3 | 8.0 | 110 | 2.81 | 2.65 | 2.84 | 3.25 | Comparison |
| 23 | 0.65 μm | 0.90 μm | 7:3 | 7.0 | 101 | 2.84 | 2.80 | 2.84 | 2.88 | Invention |
| 24 | 0.65 μm | 0.90 μm | 7:3 | 6.0 | 95 | 2.88 | 2.83 | 2.87 | 2.92 | Invention |
| 25 | 0.65 μm | 0.90 μm | 7:3 | 5.0 | 89 | 2.79 | 2.75 | 2.80 | 2.83 | Invention |
| 26 | 0.75 μm | 0.90 μm | 7:3 | 8.0 | 116 | 3.24 | 3.08 | 3.21 | 3.64 | Comparison |
| 27 | 0.75 μm | 0.90 μm | 7:3 | 7.0 | 110 | 3.22 | 3.15 | 3.22 | 3.29 | Invention |
| 28 | 0.75 μm | 0.90 μm | 7:3 | 6.0 | 104 | 3.22 | 3.14 | 3.19 | 3.24 | Invention |
| 29 | 0.75 μm | 0.90 μm | 7:3 | 5.0 | 99 | 3.09 | 3.07 | 3.11 | 3.15 | Invention |
| 30 | 0.75 μm | 0.95 μm | 7:3 | 8.0 | 132 | 2.29 | 2.10 | 2.30 | 2.55 | Comparison |
| 31 | 0.75 μm | 0.95 μm | 7:3 | 7.0 | 121 | 2.32 | 2.18 | 2.31 | 2.36 | Comparison |
| 32 | 0.75 μm | 0.95 μm | 7:3 | 6.0 | 113 | 2.35 | 2.22 | 2.33 | 2.37 | Comparison |
| 33 | 0.75 μm | 0.95 μm | 7:3 | 5.0 | 104 | 2.20 | 2.19 | 2.24 | 2.30 | Comparison |

*Characteristic curve has a plateau at an intermediate density region.

The following have been understood from the result in Table 1.

Samples 1–5 using the emulsion having the average grain size smaller than the claimed value, 0.6 μm, in the blue sensitive layer is too lower in both of the sensitivity and the gradation. Besides, Samples 30–33, in the blue-sensitive layer of which an emulsion having an average grain size larger than the upper limit of the claimed grain size, 0.9 μm, is used, are high in the sensitivity but undesirably too lower in the gradation because of lower developability thereof.

The samples in which the difference of the average grain size between two emulsions used in the blue-sensitive emulsion layer is 0.05 μm or less, Sample Nos.17 to 21, are not suitable for the light-sensitive material for printing because the contrast is too high and the latitude is too narrow.

Moreover, in the samples with the coating amount of the sensitizing dye falling without of the range of the invention, the gradation is remarkably varied depending on the temperature at the time of exposure and insufficient in the stability in the gradation even though the sensitivity and gradation are sufficient under the ordinary condition.

On the other hand, the color light-sensitive material which was excellent in sensitivity and gradation and had gradation stability extremely excellent furthermore for the variation in temperature found out the sample within the range in the combination of grain sizes in the present invention as for the coated amount of the sensitizing dye.

Example 2

Experiments were carried out in the same manner as in Example 1 except that the kind of the sensitizing dye and the kind of the stabilizing agent in chemical ripening were changed like showing Table 2. The coated amount of the stabilizing agent was adjusted to the same to STAB-1 used by example 1 amount. The result was shown in the table.

TABLE 2

| Sample No. | Average grain size Emulsion A (Mixing ratio 65%) | Average grain size Emulsion B (Mixing ratio 35%) | Kind of stabilizer | Kind of sensitizing dye | Coating amount of blue-sensitizing ($10^{-4}$ g/m$^2$) | Relative Sensitivity | Gradation | Gradation by exposure at various temperature 10° C. | 20° C. | 30° C. | Remarks |
|---|---|---|---|---|---|---|---|---|---|---|---|
| 34 | 0.65 μm | 0.86 μm | STB-1 | BS-1 | 9.0 | 115 | 2.69 | 2.40 | 2.64 | 3.15 | Comp. |
| 35 | 0.65 μm | 0.86 μm | STB-1 | BS-1 | 7.0 | 100 | 2.82 | 2.76 | 2.80 | 2.85 | Inv. |
| 36 | 0.65 μm | 0.86 μm | STB-1 | BS-1 | 5.0 | 80 | 2.73 | 2.69 | 2.75 | 2.82 | Inv. |
| 37 | 0.65 μm | 0.86 μm | Formula III Exemplified compound 1 | BS-1 | 9.0 | 130 | 2.95 | 2.54 | 2.92 | 3.31 | Comp. |
| 38 | 0.65 μm | 0.86 μm | Formula III Exemplified compound I | BS-1 | 7.0 | 113 | 3.01 | 2.94 | 3.00 | 3.10 | Inv. |
| 39 | 0.65 μm | 0.86 μm | Formula III Exemplified compound 1 | BS-1 | 5.0 | 92 | 2.94 | 2.90 | 2.91 | 2.97 | Inv. |
| 40 | 0.65 μm | 0.86 μm | STB-1 | Exemplified compound I-5 | 9.0 | 123 | 2.86 | 2.65 | 2.82 | 3.30 | Comp. |
| 41 | 0.65 μm | 0.86 μm | STB-1 | Exemplified compound I-5 | 7.0 | 108 | 2.84 | 2.74 | 2.85 | 2.91 | Inv. |
| 42 | 0.65 μm | 0.86 μm | STB-1 | Exemplified compound I-5 | 5.0 | 87 | 2.79 | 2.75 | 2.80 | 2.89 | Inv. |
| 43 | 0.65 μm | 0.86 μm | Formula III Exemplified compound 1 | Exemplified compound I-5 | 9.0 | 131 | 3.01 | 3.00 | 3.03 | 3.41 | Comp. |
| 44 | 0.65 μm | 0.86 μm | Formula III Exemplified compound 1 | Exemplified compound I-5 | 7.0 | 119 | 3.14 | 3.12 | 3.16 | 3.23 | Inv. |
| 45 | 0.65 μm | 0.86 μm | Formula III Exemplified compound 1 | Exemplified compound I-5 | 5.0 | 105 | 3.07 | 3.05 | 3.10 | 3.17 | Inv. |
| 46 | 0.65 μm | 0.86 μm | STB-1 | Mixture of | 9.0 | 140 | 3.09 | 2.92 | 3.07 | 3.50 | Comp. |

TABLE 2-continued

| Sample No. | Average grain size: Emulsion A (Mixing ratio 65%) | Average grain size: Emulsion B (Mixing ratio 35%) | Kind of stabilizer | Kind of sensitizing dye | Coating amount of blue-sensitizing ($10^{-4}$ g/m$^2$) | Relative Sensitivity | Gradation | Gradation by exposure at various temperature: 10° C. | 20° C. | 30° C. | Remarks |
|---|---|---|---|---|---|---|---|---|---|---|---|
| | | | | exemplified compound I-8/II-8 (mixing ratio 2:8) | | | | | | | |
| 47 | 0.65 μm | 0.86 μm | STB-1 | Mixture of exemplified compound I-8/II-8 (mixing ratio 2:8) | 7.0 | 123 | 3.17 | 3.10 | 3.15 | 3.21 | Inv. |
| 48 | 0.65 μm | 0.86 μm | STB-1 | Mixture of exemplified compound I-8/II-8 (mixing ratio 2:8) | 5.0 | 111 | 3.13 | 3.07 | 3.13 | 3.18 | Inv. |
| 49 | 0.65 μm | 0.86 μm | Formula III Exemplified compound 1 | Mixture of exemplified compound I-8/II-8 (mixing ratio 2:8) | 9.0 | 165 | 3.12 | 3.06 | 3.13 | 3.49 | Comp. |
| 50 | 0.65 μm | 0.86 μm | Formula III Exemplified compound 1 | Mixture of exemplified compound I-8/II-8 (mixing ratio 2:8) | 7.0 | 140 | 3.17 | 3.19 | 3.19 | 3.20 | Inv. |
| 51 | 0.65 μm | 0.86 μm | Formula III Exemplified compound 1 | Mixture of exemplified compound I-8/II-8 (mixing ratio 2:8) | 5.0 | 129 | 3.15 | 3.15 | 3.16 | 3.16 | Inv. |
| 52 | 0.75 μm | 0.86 μm | STB-1 | Mixture of exemplified compound I-8/II-8 (mixing ratio 2:8) | 9.0 | 172 | 3.06 | 3.02 | 3.10 | 3.42 | Comp. |
| 53 | 0.75 μm | 0.86 μm | STB-1 | Mixture of exemplified compound I-8/II-8 (mixing ratio 2:8) | 7.0 | 144 | 3.15 | 3.14 | 3.17 | 3.20 | Inv. |
| 54 | 0.75 μm | 0.86 μm | STB-1 | Mixture of exemplified compound I-8/II-B (mixing ratio 2:8) | 5.0 | 125 | 3.11 | 3.09 | 3.12 | 3.16 | Inv. |
| 55 | 0.75 μm | 0.86 μm | Formula III Exemplified compound 1 | Mixture of exemplified compound I-8/II-8 (mixing ratio 2:8) | 9.0 | 198 | 3.18 | 3.01 | 3.17 | 3.54 | Comp. |
| 56 | 0.75 μm | 0.86 μm | Formula III Exemplified compound 1 | Mixture of exemplified compound I-8/II-8 (mixing ratio 2:8) | 7.0 | 175 | 3.25 | 3.24 | 3.26 | 3.26 | Inv. |
| 57 | 0.75 μm | 0.86 μm | Formula III Exemplified compound 1 | Mixture of exemplified compound I-8/II-8 (mixing ratio 2:8) | 5.0 | 156 | 3.17 | 3.19 | 3.18 | 3.19 | Inv. |
| 58 | 0.75 μm | 0.86 μm | Formula III Exemplified compound 26 | Mixture of exemplified compound I-8/II-8 (mixing ratio 2:8) | 9.0 | 166 | 3.20 | 3.08 | 3.19 | 3.51 | Comp. |

TABLE 2-continued

| Sample No. | Average grain size: Emulsion A (Mixing ratio 65%) | Average grain size: Emulsion B (Mixing ratio 35%) | Kind of stabilizer | Kind of sensitizing dye | Coating amount of blue-sensitizing ($10^{-4}$ g/m$^2$) | Relative Sensitivity | Gradation | Gradation by exposure at various temperature: 10° C. | 20° C. | 30° C. | Remarks |
|---|---|---|---|---|---|---|---|---|---|---|---|
| 59 | 0.75 μm | 0.86 μm | Formula III Exemplified compound 26 | Mixture of exemplified compound I-8/II-8 (mixing ratio 2:8) | 7.0 | 150 | 3.23 | 3.25 | 3.26 | 3.26 | Inv. |
| 60 | 0.75 μm | 0.86 μm | Formula III Exemplified compound 26 | Mixture of exemplified compound I-8/II-8 (mixing ratio 2:8) | 5.0 | 137 | 3.21 | 3.20 | 3.20 | 3.21 | Inv. |

It is found out from the results of Tables 7 and 8 that the sensitivity, the gradation and the stability of gradation to the variation of the temperature at the time of exposure of the samples are sufficient when the mixed emulsion satisfying the requirements of the invention as to the average grain size is used in the blue-sensitive emulsion layer. Such effects have been established also in Example 1.

Moreover, it is found that the gradation variation depending on the temperature at the time of exposing is considerably lowered in Sample Nos. 50, 51, 56, 57, 59 and 60 in which stabilizers of Formula 3 were used together with the sensitizing dye. These samples also have sufficient sensitivity and gradation.

Example 3 P

Experiments shown in Examples 1 and 2 were repeated except that yellow coupler YC-8 or Y-12 were used in place of the yellow coupler used in Examples 1 and 2.

As the results of the experiments, the same effects as in Examples 1 and 2 were reproduced. Moreover, it was found that the samples were excellent because of the yellow couplers have sharp spectral adsorption and superior in the color reproduction.

What is claimed is:

1. A silver halide light-sensitive photographic material comprising a support having thereon a blue-sensitive silver halide emulsion layer comprising a mixture of at least two kinds of silver halide emulsions each optically sensitized with at least one blue-sensitizing dye, wherein (1) said silver halide emulsions each comprise silver chloride grains or silver chlorobromide grains having a silver chloride content not less than 90 mol %, (2) said silver halide emulsions each have an average grain size, in terms of diameter of spherical grain, being within the range of 0.6 μm to 0.9 μm and being different from each other in the average grain size by 0.07 μm to 0.15 μm, and (3) a total coating amount of said at least one blue-sensitizing dye is not more than $7.0\times10^{-4}$ g/m$^2$.

2. The photographic material of claim 1, wherein said blue-sensitive emulsions are sensitized with a dye represented by the following Formula 1 and a dye represented by the following Formula 2:

Formula 2:

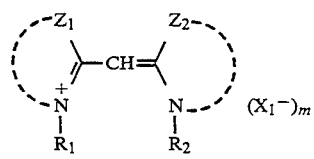

(1)

wherein $Z_1$ and $Z_2$ are independently a group of atoms necessary to complete a thiazole ring, a benzothiazole ring, a benzoselenazole ring, a naphthothiazole ring or a naphthoselenazole ring; $R_1$ and $R_2$ are independently an aliphatic group or an aliphatic group having a carboxyl group or a sulfo group provided that at least one of $R_1$ and $R_2$ is an aliphatic group having a carboxyl group or a sulfo group; $X_1$ is an acid anion: and m is an integer of 0 or 1,

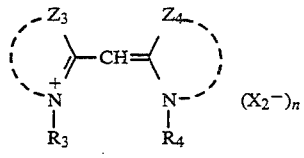

(2)

wherein $Z_3$ and $Z_4$ are independently a group of atoms necessary to complete a thiazole ring, a benzothiazole ring or a benzoselenazole ring; $R_3$ and $R_4$ are independently an aliphatic group provided that at least one of $R_3$ and $R_4$ is an aliphatic group having a carboxyl group or a sulfo group; $X_2$ is an acid anion: and n is an integer of 0 or 1.

3. The photographic material of claim 1, wherein the amount of said blue-sensitizing dye is $4.0\times10^{-4}$ g/m$^2$ to $7.0\times10^{-4}$ g/m$^2$.

4. The photographic material of claim 1, wherein said photographic material is a color photographic material further comprising a green-sensitizing silver halide emulsion layer and a red-sensitive silver halide emulsion layer.

* * * * *